United States Patent Office 2,774,800
Patented Dec. 18, 1956

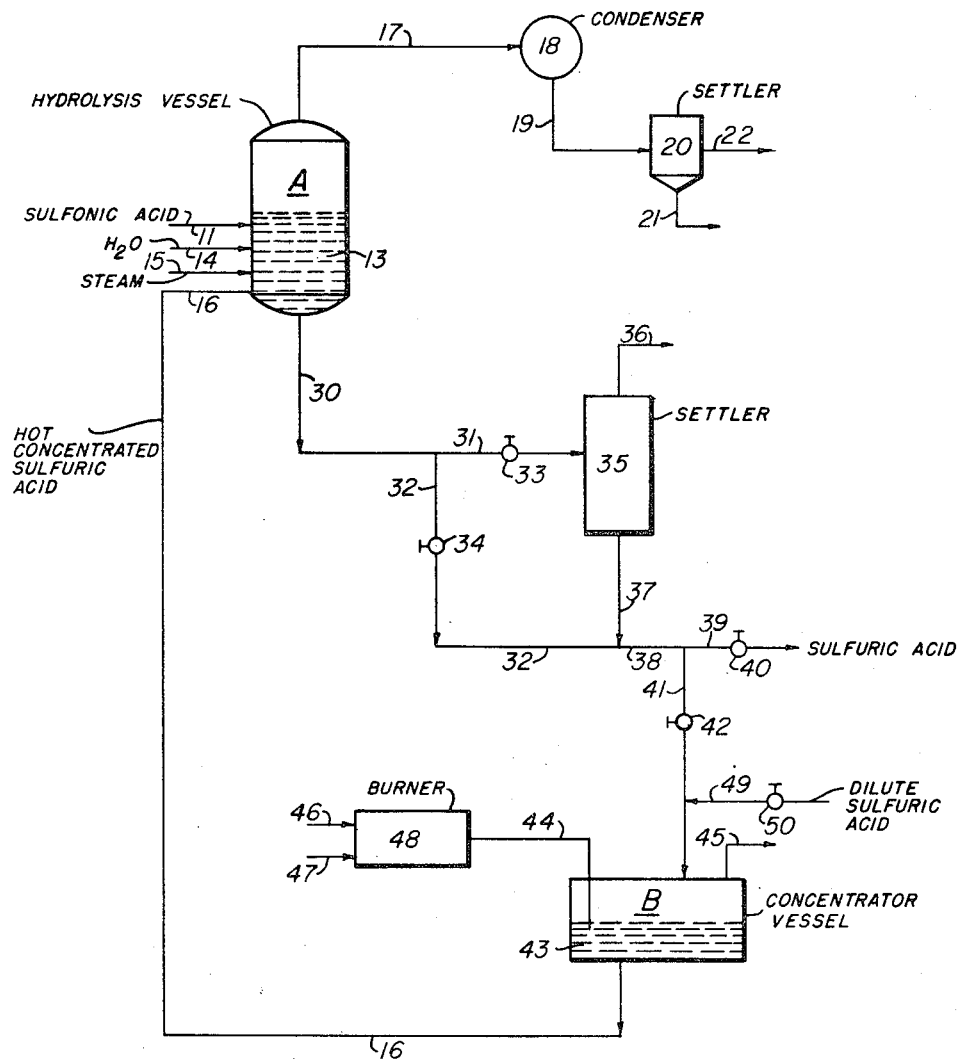

2,774,800

METHOD FOR HYDROLYZING SULFONIC ACIDS

Albert J. Shmidl, Crosby, and James L. Walker, Baytown, Tex., assignors, by mesne assignments, to Esso Research and Engineering Company, Elizabeth, N. J., a corporation of Delaware Application August 23, 1954, Serial No. 451,456

4 Claims. (Cl. 260—668)

The present application is directed to a method for hydrolyzing sulfonic acids of aromatic hydrocarbons.

In the treatment of hydrocarbon fractions with concentrated sulfuric acid a sludge usually results. This sludge usually comprises a substantial proportion of sulfonic acids. For economic reasons it is often desirable to treat such sludges in order to recover the hydrocarbons therefrom as well as a sulfuric acid fraction.

The present invention is directed to an improved method for the recovery of hydrocarbons and sulfuric acid from hydrocarbon sulfuric acid sludges containing sulfonic acids.

Briefly, the present invention is directed to a procedure wherein a mixture of hydrocarbon sulfonic acids, water and hot sulfuric acid is charged as a feed stock into a hydrolysis zone maintained at a temperature in the range from 280° to 310° F. to allow the sulfonic acids to hydrolyze. An acid concentration zone is maintained in which hot inert gases are contacted with dilute sulfuric acid to concentrate the acid and heat it. From the hydrolysis zone a hydrocarbon fraction and a dilute sulfuric acid fraction are removed. The hydrocarbon fraction is recovered and the dilute sulfuric acid fraction may be charged to the acid concentrating zone. Hot concentrated acid from the acid concentrating zone is charged to the hydrolysis zone where it serves as the sulfuric acid introduced into the zone to assist in the hydrolysis reaction.

The present invention is particularly adapted to the recovery of valuable aromatic hydrocarbons from acid sludge that is ordinarily burned as a waste product in refinery practice. Large amounts of aromatic hydrocarbons, such as benzene, toluene and xylenes, are produced by hydrocarbon conversion processes and then subjected to a purification treatment with concentrated sulfuric acid. A part of the treated aromatics is unavoidably sulfonated. Part of the sulfonic acids so formed are retained in the oil and part in the acid. Additional aromatics are retained in the acid by entrainment or solubilization or similar phenomena. The acid which has been spent in treating aromatics is designated "acid sludge." According to the present invention, the said acid sludge, and also the said sulfonic acids which were retained in the treated oil and may be recovered therefrom by a water washing step, may be charged to the hydrolysis step as described below to permit recovery of aromatic hydrocarbons and of concentrated sulfuric acid therefrom.

In a typical operation, 1000 barrels of a mixed xylenes fraction obtained from hydroforming is treated with 20 pounds per barrel of 98% $H_2SO_4$ for the purpose of purifying it by removing residual olefins. This treatment leaves about 2000 pounds of xylene sulfonic acids dissolved in the treated fraction. Also produced are 37,200 pounds of acid sludge of approximately the following composition.

| | Percent |
|---|---|
| $H_2SO_4$ | 63 |
| $H_2O$ | 17 |
| Carbon [1] | 20 |

[1] Includes hydrocarbons as such and sulfonated hydrocarbon radicals.

The treated xylenes fraction is washed with about 2 volume percent water; this removes the dissolved xylene sulfonic acids into the water layer. The water layer and the sludge may then be combined to form the feed stock charged to the hydrolysis operation described below.

The present invention will now be described in greater detail in conjunction with the drawing in which the sole figure is in the form of a diagrammatic flow sheet illustrating one mode for practicing the present invention.

Turning now specifically to the drawing, the feed stock containing the sulfonic acid to be hydrolyzed is passed by inlet line 11 into a hydrolysis vessel A where it is incorporated in the body of liquid 13 maintained within the vessel. Also, water is discharged into the vessel through inlet line 14, steam introduced through inlet line 15 and hot concentrated sulfuric acid through line 16.

The upper end of reaction vessel A is provided with an outlet line 17 provided with a condenser 18. The condenser has a drain line 19 which leads to a drum 20 and which in turn has a bottom drain line 21 and a side outlet line 22. If the hydrocarbon released from the hydrolysis step is volatile at the temperature of the reaction zone, it will discharge as a vapor in admixture with water vapors through outlet line 17 and the hydrocarbon vapors and water vapors will condense in condenser 18 and pass through line 19 to drum 20 from which the water may be drained through line 21 and the hydrocarbon removed through line 22.

A dilute sulfuric acid fraction is withdrawn from the bottom of hydrolysis vessel A through line 30 which connects with branch lines 31 and 32. Branch line 31 is provided with valve 33 and discharges into settling vessel 35 which has an outlet line 36 from its upper end and an outlet line 37 from its lower end. Branch line 32 is provided with a valve 34. Outlet line 37, as well as branch line 32, discharges into line 38 which in turn discharges either into branch line 39 provided with valve 40 or branch line 41 provided with valve 42.

Branch line 41 discharges into sulfuric acid concentrator B where the dilute acid is heated, thereby driving off water and concentrating the acid. The hot concentrated acid is withdrawn from concentrator vessel B through line 16 and recycled by hydrolysis vessel A. Dilute sulfuric acid for concentration in vessel B may also be supplied from other sources through line 49, controlled by valve 50.

A body 43 of hot sulfuric acid is maintained in concentrator vessel B and heated inert gas is passed into body 43 by means of inlet line 44 which discharges in vessel B below the surface of the acid. The inert gases as well as water vapors which are removed from the body of acid 43 are removed from vessel B by means of vent line 45.

It will be understood that any suitable source of hot inert gases may be used for bubbling through the body of acid in vessel B for the purpose of heating and concentrating the acid within the vessel. However, for purposes of illustration it may be assumed that the hot inert gases or flue gases are produced by passing air through inlet line 46 and gas through inlet line 47 into a burner 48 which burner produces the flue gas which in turn passes through line 44 and discharges into concentrator vessel B.

It will be understood that the temperatures maintained within hydrolysis vessel A and concentrator vessel B are inter-related with the concentrations of the acid within these vessels. By way of specific example the following temperatures and concentrations for the system will be found desirable. The body of fluid within vessel A is kept at a temperature in the range from 280° F. to 310° F. and a 65% sulfuric acid is withdrawn through line 30. The body of acid in concentrator B is maintained at a temperature of 400° F. by passing flue gas at a temperature of 1200° F. through said body of liquid. Sulfuric acid having the concentration of approximately 87.5% and a temperature of approximately 400° F. is withdrawn from concentrator vessel B through line 16 and discharged into hydrolysis vessel A.

As disclosed heretofore, the sulfonic acids treated in accordance with the present invention may be any of the sulfonic acids of aromatic hydrocarbons, obtained in industrial operations which it is desirable to separate into a hydrocarbon fraction and a sulfuric acid fraction by hydrolysis. The aromatic hydrocarbon contained in the sulfonic acids will ordinarily have from 6 to 10 carbon atoms in the molecule.

The following is given by way of a specific example in the treatment of a xylenes sulfonic acid fraction in a procedure in accordance with the present invention in which the body of liquid in the hydrolysis vessel A is maintained at 300° F. and the body of sulfuric acid in concentrator vessel B is maintained at 400° F. If a xylenes sulfonic acid fraction in the amount of 18 tons per day is to be hydrolyzed, this amount of sulfonic acid plus approximately 127 tons a day of water and 35 tons a day of concentrated sulfuric acid are fed to hydrolysis vessel A. Within hydrolysis vessel A the xylenes are separated by hydrolysis and are evaporated so that approximately 9 tons per day of xylenes are recovered through outlet line 22. Along with the xylenes approximately 5 tons per day of water are evaporated from vessel A and drawn off through outlet 21. Approximately 44 tons per day of 65% sulfuric acid are withdrawn from hydrolysis vessel A through line 30. When a xylenes sulfonic acid fraction is being treated, substantially all of the hydrocarbons are removed as overhead from vessel A so that it is not necessary to pass the fraction removed through outlet line 30 into settling vessel 35 but instead vessel 35 is by-passed. The sulfuric acid stream is divided into two fractions with one portion being withdrawn from the system through outlet line 39 and the remainder being passed through branch line 41 into acid concentrator B where it is concentrated by maintaining the body of sulfuric acid at approximately 400° F. with passage of hot inert gases therethrough as previously explained. The hot concentrated acid is recycled to hydrolysis vessel A through line 16 as previously explained.

While we have disclosed specific examples in describing the process of the present invention, it will be obvious to a workman skilled in the art that other conditions may be used without departing from the scope of the invention.

What we wish to claim is:

1. In a continuous method for hydrolyzing aromatic hydrocarbon sulfonic acids wherein said sulfonic acids, water and a stream of concentrated sulfuric acid are continuously charged to a hydrolysis zone having a temperature within the range from about 280° to 310° F. in amounts sufficient to cause hydrolysis of said sulfonic acids to form an aromatic hydrocarbon fraction and a dilute sulfuric acid fraction and wherein the said hydrocarbon fraction and the said dilute sulfuric acid fraction are continuously withdrawn from said hydrolysis zone, the improvement which comprises the steps of passing said dilute sulfuric acid fraction into an acid concentration zone and there discharging a high temperature inert gas through said sulfuric acid fraction to concentrate the sulfuric acid and to heat the same to a temperature above the temperature of said hydrolysis zone and continuously recycling at least a portion of the said heated concentrated sulfuric acid to said hydrolysis zone as the concentrated sulfuric acid charge stream, said recycled portion of said heated concentrated sulfuric acid being introduced into said hydrolysis zone at a temperature above the temperature of said hydrolysis zone in an amount sufficient to maintain the temperature of said hydrolysis zone within said range of about 280° to 310° F.

2. In a continuous method for hydrolyzing xylene sulfonic acids contained in a sludge wherein the said sludge, water and a stream of concentrated sulfuric acid are continuously charged to a hydrolysis zone having a temperature in the range from about 280° to 310° F. in amounts sufficient to cause hydrolysis of said xylene sulfonic acids to form a xylenes fraction and a dilute sulfuric acid fraction, wherein the xylenes fraction and the dilute sulfuric acid fraction are continuously withdrawn from said hydrolysis zone, wherein the xylenes fraction is evaporated and wherein xylenes are continuously recovered from said withdrawn xylenes fraction, the improvement which comprises the steps of passing said dilute sulfuric acid fraction into an acid concentrating zone and there discharging a high temperature inert gas through said dilute sulfuric acid fraction to concentrate the sulfuric acid and to heat the same to a temperature above the temperature of said hydrolysis zone and continuously recycling at least a portion of the said heated concentrated sulfuric acid to said hydrolysis zone as the concentrated sulfuric acid charge stream, said recycled portion of said heated concentrated sulfuric acid being introduced into said hydrolysis zone at a temperature above the temperature of said hydrolysis zone in an amount sufficient to maintain the temperature of said hydrolysis zone within said range of about 280° to 310° F.

3. A method as in claim 2 wherein the hydrolysis zone is maintained at a temperature of about 300° F. and wherein the dilute sulfuric acid fraction is concentrated to an extent sufficient to provide a sulfuric acid stream of approximately 87.5% concentration having a temperature of about 400° F.

4. In a continuous method for hydrolyzing aromatic hydrocarbon sulfonic acids in a hydrolysis zone maintained at a temperature in the range from about 280° to 310° F. wherein said sulfonic acids, water, a stream of concentrated sulfuric acid having a temperature greater than the temperature of said hydrolysis zone and steam are continuously charged to said hydrolysis zone in amounts sufficient to maintain said hydrolysis temperature and to cause hydrolysis of said sulfonic acids into an aromatic hydrocarbon fraction and a dilute sulfuric acid fraction and wherein the said hydrocarbon fraction and dilute sulfuric acid fraction are continuously removed from said hydrolysis zone, the improvement which comprises the steps of passing said dilute sulfuric acid fraction into an acid concentrating zone and there discharging a high temperature inert gas through said sulfuric acid fraction to concentrate the sulfuric acid and to heat the same to a temperature above the temperature of said hydrolysis zone and continuously recycling at least a portion of the said heated concentrated sulfuric acid to said hydrolysis zone, the amount of recycled heated concentrated sulfuric acid being sufficient to maintain the sulfuric acid concentration at reaction temperature in said hydrolysis zone for hydrolysis of said sulfonic acids.

References Cited in the file of this patent

UNITED STATES PATENTS

| | | |
|---|---|---|
| 1,429,140 | Heckenbleikner et al. | Sept. 12, 1922 |
| 1,745,692 | Halloran et al. | Feb. 4, 1930 |
| 2,530,953 | Fuqua | Nov. 21, 1950 |
| 2,688,644 | Shmidl et al. | Sept. 7, 1954 |